United States Patent [19]
Miki et al.

[11] Patent Number: 5,503,430
[45] Date of Patent: Apr. 2, 1996

[54] ROLLOVER PROTECTION SYSTEM FOR A WORKING VEHICLE

[75] Inventors: Hiroyuki Miki; Tsutomu Toiguchi, both of Sakai, Japan

[73] Assignee: Kubota Corporation, Japan

[21] Appl. No.: 232,752

[22] Filed: Apr. 22, 1994

[30] Foreign Application Priority Data

Dec. 28, 1993 [JP] Japan .................................. 5-334787

[51] Int. Cl.⁶ ................................................. B60R 21/13
[52] U.S. Cl. ............................................................ 280/756
[58] Field of Search ............................. 280/756, DIG. 6; 296/1.1, 63

[56] References Cited

U.S. PATENT DOCUMENTS

| | | | |
|---|---|---|---|
| 4,666,183 | 5/1987 | Azzarello | 280/756 |
| 4,877,265 | 10/1989 | DeBraal et al. | 280/756 |
| 5,042,835 | 8/1991 | Burns | 280/756 |
| 5,154,435 | 10/1992 | Chiu | 280/DIG. 6 |

FOREIGN PATENT DOCUMENTS

| | | |
|---|---|---|
| 0051100 | 5/1982 | European Pat. Off. . |
| 0353472 | 2/1990 | European Pat. Off. . |
| 0458761 | 11/1991 | European Pat. Off. . |
| 2543077 | 3/1977 | Germany . |
| 1522906 | 8/1978 | United Kingdom . |
| 2175259 | 6/1985 | United Kingdom . |

OTHER PUBLICATIONS

Patent Abstracts of Japan, vol. 16, No. 82, Feb. 27, 1992 (1 page).

*Primary Examiner*—Margaret A. Focarino
*Assistant Examiner*—Christopher Ellis
*Attorney, Agent, or Firm*—Webb Ziesenheim Bruening Logsdon Orkin & Hanson

[57] ABSTRACT

A rollover protection system for a working vehicle including a pair of lower props fixed at lower ends thereof to a chassis, a U-shaped upper cross bar pivotally connected to upper ends of the lower props, and connectors disposed between the lower props and the upper cross bar for selectively permitting the upper cross bar to pivot relative to the lower props. The connectors have a pair of right and left engaging members disposed at the upper ends of the lower props, respectively, a pair of right and left engageable members disposed at lower ends of the upper cross bar, respectively, and control handles for selecting between a first state to engage the engaging members and the engageable members, and a second state to disengage the engaging members and the engageable members. The lower props and the upper cross bar have such shapes and dimensions that, when the control handles are operated to provide the second state, the engaging members and the engageable members are elastically movable away from each other.

14 Claims, 5 Drawing Sheets

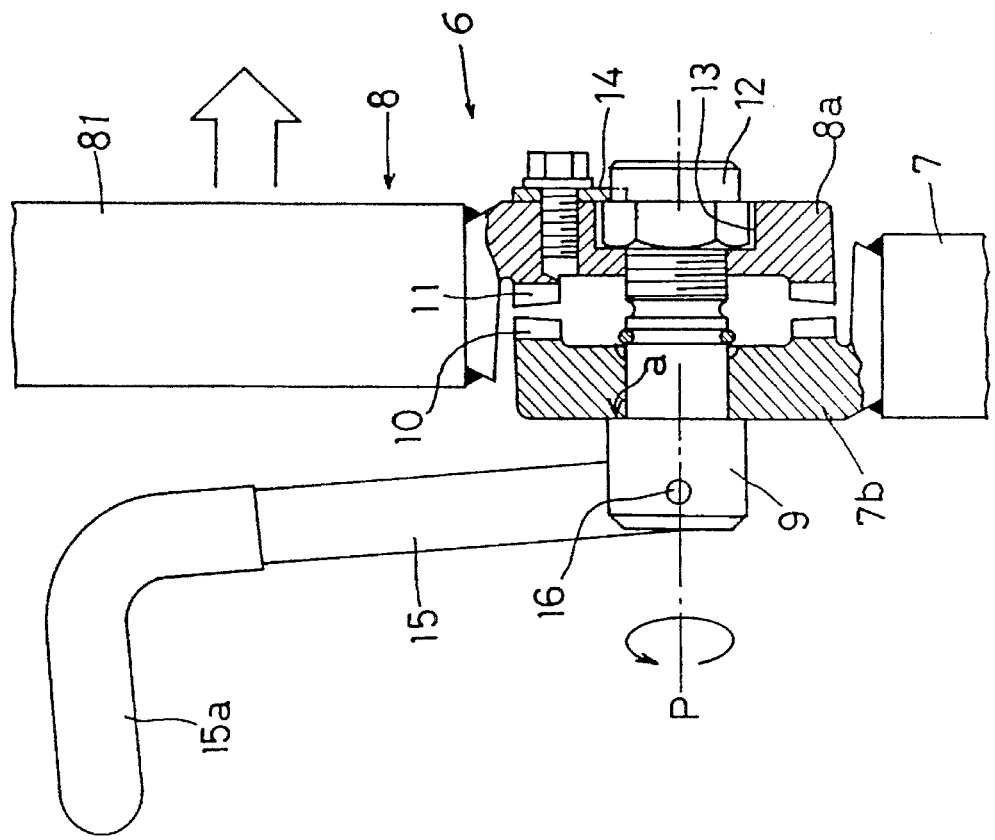
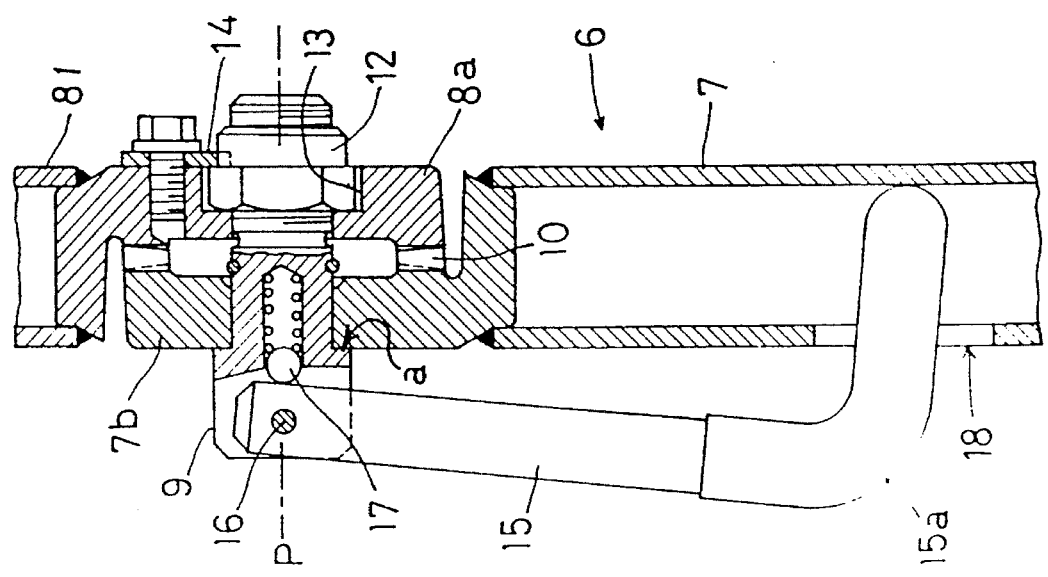

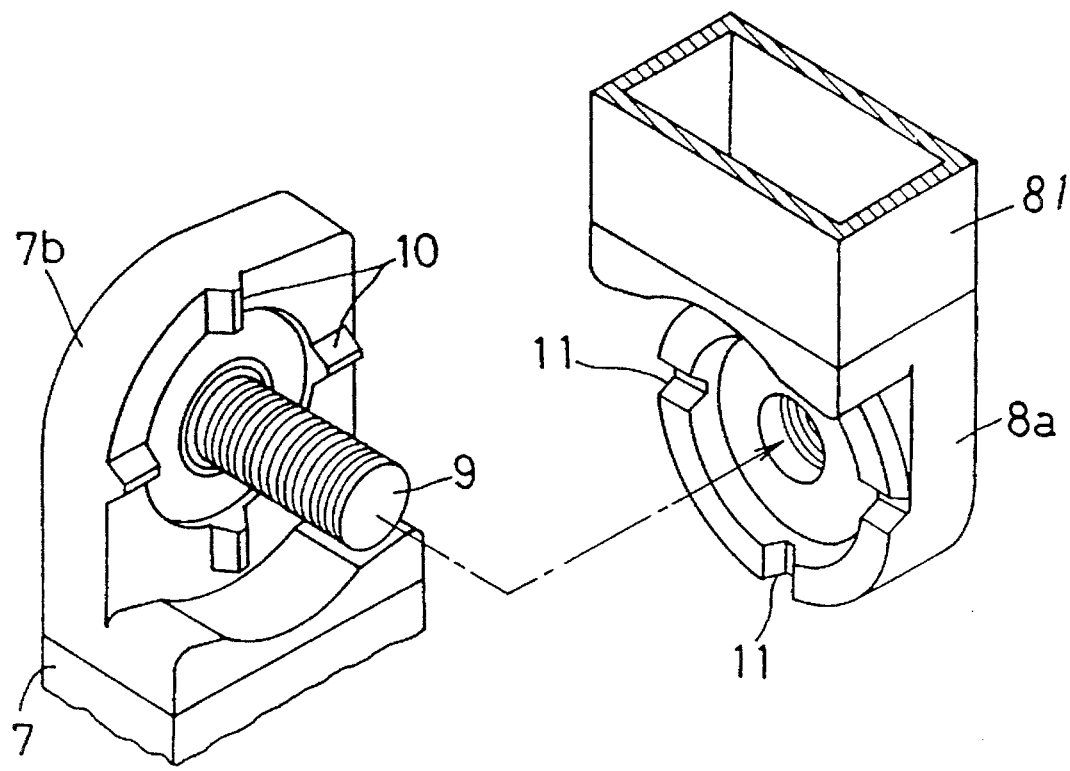
F I G . 4

ROLLOVER PROTECTION SYSTEM FOR A WORKING VEHICLE

BACKGROUND OF THE INVENTION

1. Field of the Invention

The present invention relates to a rollover protection system (ROPS) for a working vehicle having a rollover protection bar assembly extending over a vehicle body.

2. Description of the Related Art

This type of rollover protection system, as disclosed in U.S. Pat. No. 4,877,265 or U.K. Patent Publication GB 2 174 259A, has a rollover protection bar assembly extending over a vehicle body to be adjustable in height. During an ordinary operation, for example, the rollover protection bar assembly is raised to protect the driver in case the working vehicle should overturn. During an operation in a vertically limited space, or when putting the vehicle into a barn (in the case of an agricultural working vehicle), the rollover protection bar assembly is lowered to facilitate the operation or storage.

The conventional rollover protection system noted above includes two or more protective bars simply joined together by means of bolts or pins. For changing height of the rollover protection bar assembly, the bars are disconnected and connected again by removing and inserting the bolts or pins. This is not only a troublesome operation, but components of the rollover protection bar assembly could be lost such as by dropping the bolts or pins. Thus, there is room for improvement in handling convenience.

SUMMARY OF THE INVENTION

The present invention has been made having regard to the inconvenience noted above, and its object is to provide a rollover protection system whose height may be varied simply and easily.

The above object is fulfilled, according to the present invention by a rollover protection system for a working vehicle, comprising a pair of lower props fixed at lower ends thereof to a chassis, a U-shaped upper cross bar pivotally connected to upper ends of the lower props, and connecting means disposed between the lower props and the upper cross bar for selectively permitting the upper cross bar to pivot relative to the lower props, the connecting means including a pair of right and left engaging members disposed at the upper ends of the lower props, respectively, a pair of right and left engageable members disposed at lower ends of the upper cross bar, respectively, and control means for selecting between a first state to engage the engaging members and the engageable members, and a second state to disengage the engaging members and the engageable members, wherein the lower props and the upper cross bar in their free states have such shapes and dimensions that, when the control means is operated to provide the second state, the engaging members and the engageable members are elastically movable away from each other.

The rollover protection system according to the present invention has the upper cross bar connected to the lower props to be pivotable about an axis extending transversely of the vehicle. Thus, the upper cross bar has a height variable by pivoting between an upper limit and a lower limit.

The upper cross bar is fixable to the upper limit or the lower limit by tightening connecting bolts to engage the engaging members and engageable members. When the connecting bolts are loosened, the engaging members and engageable members move away from each other. With the engaging members and engageable members completely separated from each other, the upper cross bar is pivotable with almost no resistance.

The engaging members and engageable members may be adapted not to become entirely disengaged from each other to retain an engaging force just enough to prevent the upper cross bar from pivoting by gravity. In this case, the operator swings down the upper cross bar while applying a slight force to separate the engaging members and engageable members completely. This will not require a great effort since the engaging members and engageable members are not forced away from the fully engaged state.

According to the present invention, therefore, the rollover protection bar is pivotable to vary its height through a simple operation not requiting a great force for disengaging the engaging members and engageable members. This rollover protection system has excellent handling convenience.

Other features and advantages of the invention will be apparent from the following description of preferred embodiments as illustrated in the accompanying drawings.

BRIEF DESCRIPTION OF THE DRAWINGS

FIG. 3A is a front view, partly in section, of a pivotal connection of the rollover protection system in a fixed state;

FIG. 3B is a front view, partly in section, of the pivotal connection in a released state;

FIG. 4 is an exploded perspective view of an engaging portion of the rollover protection system;

DETAILED DESCRIPTION OF THE PREFERRED EMBODIMENTS

An embodiment of the present invention as applied to a tractor will be described hereinafter with reference to the drawings.

Figure 1:
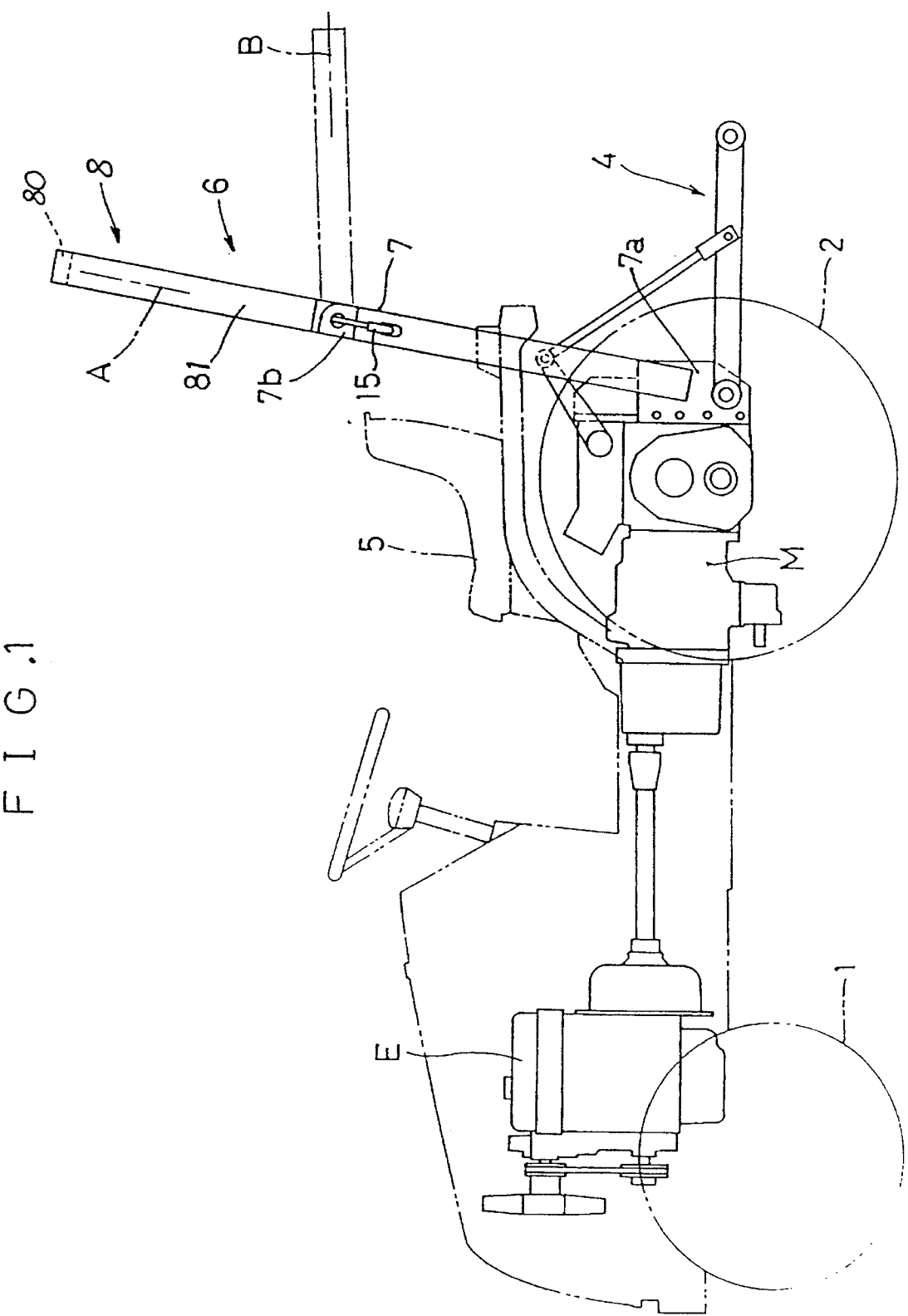
FIG. 1 is a side elevation of a tractor having a rollover protection system according to the present invention.

As shown in FIG. 1, the tractor has an engine E mounted on a front portion of a chassis having front wheels 1 and rear wheels 2. A transmission case M is disposed in a rear portion of the chassis. A three-point link mechanism 4 is disposed rearwardly of the transmission case M for connecting a working implement to the tractor. A driver's seat 5 is mounted on an upper rearward portion of the chassis, with a rollover protection bar assembly 6 erected rearwardly of the driver's seat 5.

Figure 2:
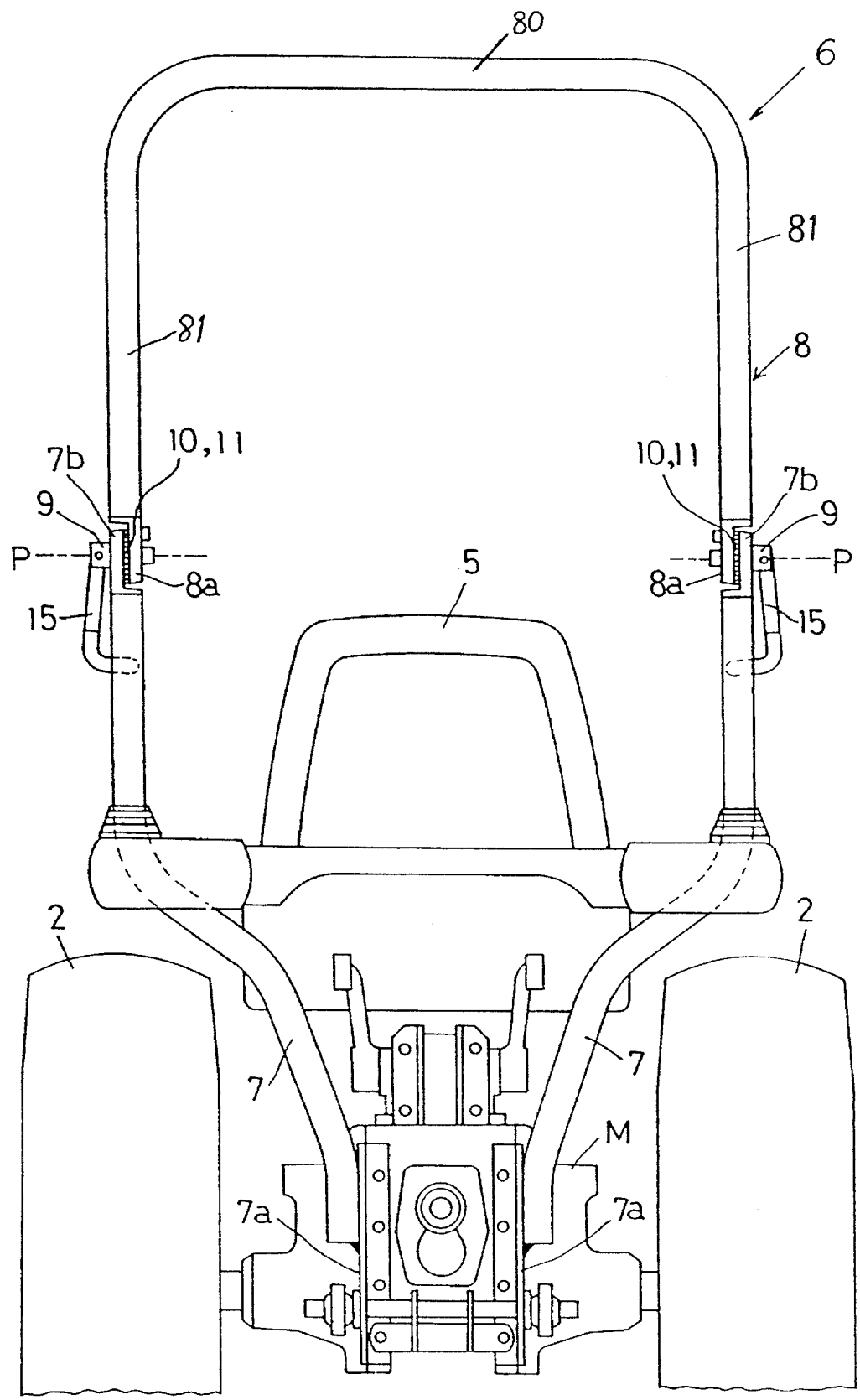
FIG. 2 is a rear view of the rollover protection system.

As shown in FIGS. 1 and 2, the rollover protection bar assembly 6 includes a pair of right and left lower props 7 formed of steel pipe and a U-shaped upper cross bar 8 also formed of steel pipe. The U-shaped cross bar 8 includes a cross portion 80 extending horizontally when the rollover protection bar assembly 6 is attached to the tractor, and a pair of vertical portions 81 extending substantially vertically from opposite ends of the cross portion 80. Each of the lower props 7 is rigidly bolted at a proximal end 7a thereof to the transmission case M. Each of the vertical portions 81 of the upper cross bar 8 is connected at a lower end thereof to an upper end of one of the lower props 7 to be pivotable about a horizontal axis P.

A forged mounting member 7b is welded to the upper end of each lower prop 7. A similar mounting member 8a is welded to the lower end of each vertical portion 8 1 of the upper cross bar 8. The two mounting members 7b and 8a may be tightened together by a connecting bolt 9 disposed on the horizontal axis P.

As shown in FIGS. 3 and 4, the mounting member 7b preferably includes an engaging portion 10 disposed on the horizontal axis P and having four inwardly facing projections. The mounting member 8a includes an engageable portion 11 disposed on the horizontal axis P and having four outwardly facing recesses corresponding to the above projections. The connecting bolt 9 extends through openings defined centrally of the mounting members 7b and 8a.

The connecting bolt 9 is a stepped bolt defining a shoulder "a" for contacting an outer surface of the mounting member 7b. The connecting bolt 9 further includes a threaded portion extending through the mounting member 8a and having a hexagon nut 12 screwed thereto. The hexagon nut 12 is fitted in a hexagonal hole defined in an inner surface of the mounting member 8a, and retained in place by a patch 14 bolted to the inner surface of the mounting member 8a.

The connecting bolt 9 further includes a head facing outwardly and having a control handle 15 attached thereto to be pivotable about a support pine 16. A spring-loaded ball 17 is mounted in the head of the connecting bolt 9. The spring-loaded ball 17 exerts a pressing force to the control handle 15, whereby the control handle 15 may be maintained steadily in a folded position swung to the lower prop 7 as shown in FIG. 3A, and in an operative position swung out as shown in FIG. 3B. The lower prop 7 has an opening 18 defined in an outer surface thereof for receiving a grip 15a of the control handle 15 in the folded position. Thus, the control handle 15 in the folded position projects only a small amount from the outer surface of the lower prop 7.

The lower props 7 and upper cross bar 8 have such shapes and dimensions that, in a free state with the connecting bolts 9 loosened, a distance between the outer surfaces of the two mounting members 8a is smaller than a distance between the inner surfaces of the mounting members 7b, that is each opposed pair of engaging portion 10 and engageable portion 11 are spaced apart from each other.

With this construction, when the connecting bolts 9 are turned tight, the vertical portions 81 of the upper cross bar 8, the latter being U-shaped to facilitate elastic deformation, are drawn outward. Consequently, as shown in FIG. 3A, each lower prop 7 and upper cross bar 8 are fixed to each other with the engaging portion 10 and engageable portion 11 locked in engagement.

When the connecting bolts 9 are loosened, the upper cross bar 8 is released from the outwardly drawing forces, and elastically restores itself. Thus, as shown in FIG. 3B, the engaging portion 10 and engageable portion 11 move away from each other, whereupon the upper cross bar 8 becomes pivotable relative to the lower props 7. For an ordinary operation, for example, the upper cross bar 8 may be locked to an upstanding posture A as shown in FIG. 1. For an operation in a vertically limited space or for storage, the upper cross bar 8 may be locked to a prostrate posture B extending rearwardly to facilitate the operation or storage. In the above embodiment, the upper cross bar 8 is adapted elastically deformable. However, the upper cross bar 8 may have increased rigidity with reinforcing stays extending along the right and left vertical portions, while the lower props 7 are formed to be elastically deformable to a certain extent. Both the upper cross bar 8 and lower props 7 may be elastically deformable. It will serve the purpose of the present invention if the upper cross bar 8 and lower props 7 have such shapes and dimensions that, in the free, released state, the mounting members 8a and 7b of the upper cross bar 8 and lower props 7 are out of engagement with each other.

The engaging portions 10 and engageable portions 11 may be adapted not to become entirely disengaged from each other in the free state with no external force applied thereto, to retain a frictional engaging force just enough to prevent the upper cross bar 8 in the upstanding posture A from falling down by gravity. In this case, the operator swings down the upper cross bar 8 while slightly deforming the upper cross bar 8 to eliminate the frictional engagement entirely. This will not require a great effort since the upper cross bar 8 is not deformed from the fully engaged state.

In the foregoing embodiment, the mounting members 7b of the lower props 7 are arranged outside the mounting members 8a of the upper cross bar 8. This positional relationship may be reversed.

Figure 5:
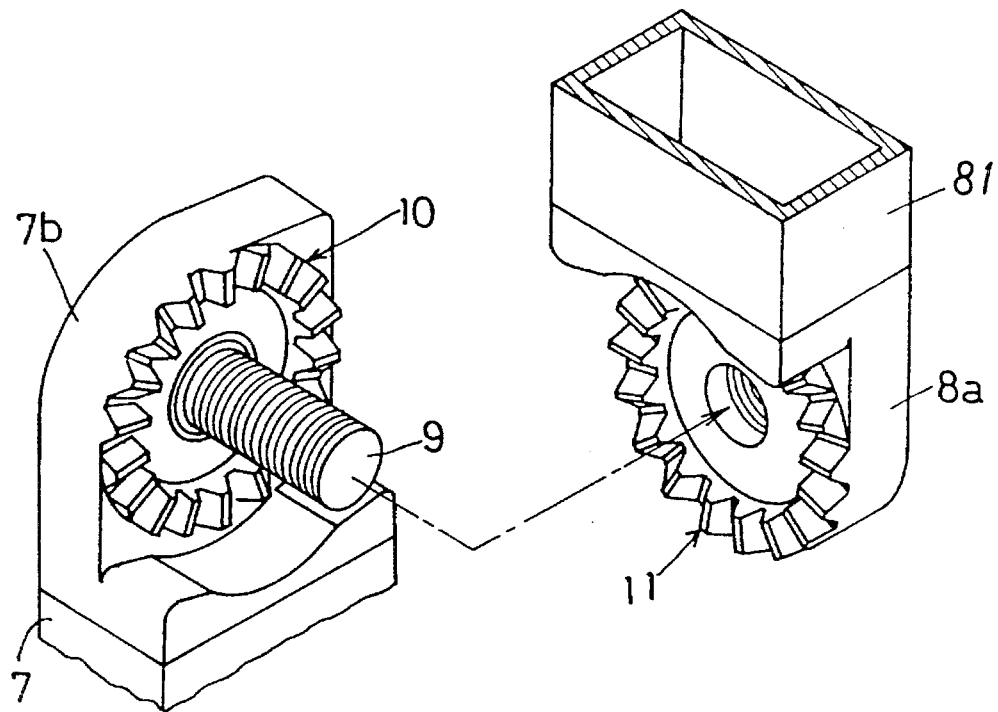
FIG. 5 is an exploded perspective view of an engaging portion in another embodiment.

As shown in FIG. 5, the engaging portion 10 and engageable portion 11 may be in the form of opposed corrugations.

Figure 6:
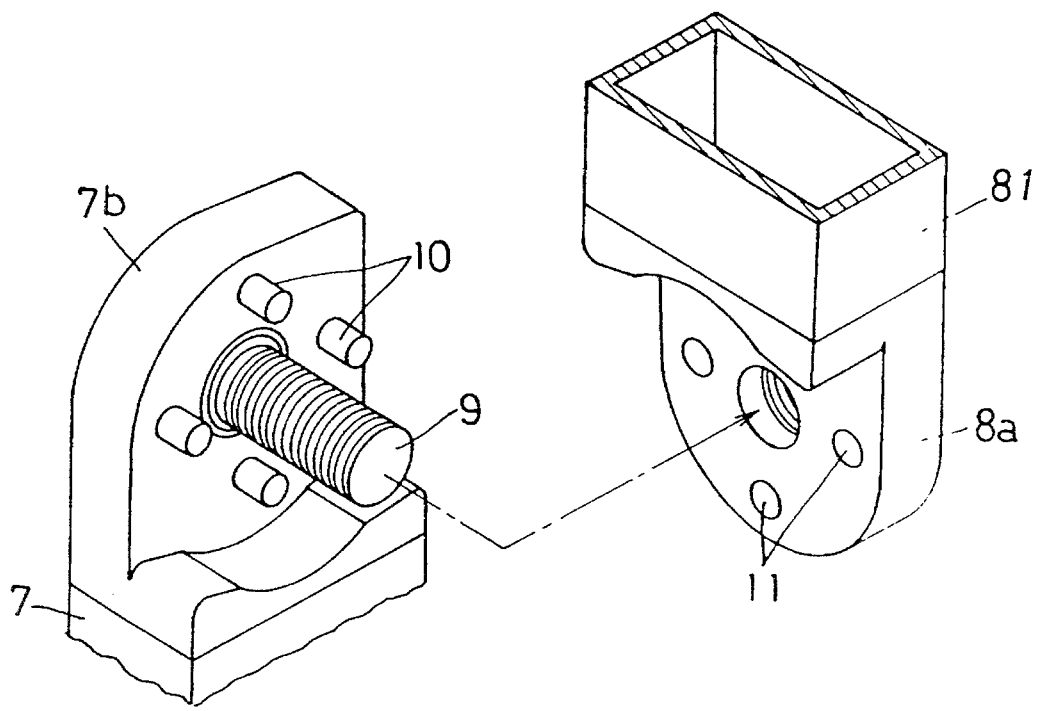
FIG. 6 is an exploded perspective view of an engaging portion in a further embodiment.

Further, as shown in FIG. 6, the engaging portion 10 may include columnar projections, with the engageable portion 11 having holes opposed thereto. The number and intervals of such projections and holes or recesses are optional.

What is claimed is:

1. A rollover protection system for a working vehicle, comprising:

a pair of lower props fixed at lower ends thereof to a chassis;

a U-shaped upper cross bar pivotally connected to upper ends of said lower props; and connecting means disposed between said lower props and said upper cross bar for selectively permitting said upper cross bar to pivot relative to said lower props, said connecting means including:

a pair of right and left engaging members disposed at said upper ends of said lower props, respectively;

a pair of right and left engageable members disposed at lower ends of said upper cross bar, respectively; and control means for selecting between a first state to engage said engaging members and said engageable members, and a second state to disengage said engaging members and said engageable members;

wherein said lower props and said upper cross bar are elastically movable between said second state of said engaging and engageable members which form an unbiased free state for said upper cross bar and said lower props, and said first state of said engaging and engageable members in which said engaging members and said engageable members are elastically biased away from each other by an elastic deformation of said lower props and said upper cross bar from said unbiased free state.

2. A rollover protection system as defined in claim 1, wherein said lower props in free state have substantially the same shape and dimensions in said first state and said second state.

3. A rollover protection system as defined in claim 1, wherein said upper cross bar has substantially the same shape and dimensions in said first state.

4. A rollover protection system as defined in claim 2, wherein said engageable members of said upper cross bar have such a shape and dimensions that, in said free state, said engageable members are spaced from said engaging members of said lower props transversely of said chassis.

5. A rollover protection system as defined in claim 2, wherein said engageable members of said upper cross bar have such a shape and dimensions that, in said free state, said engageable members are spaced from said engaging members of said lower props laterally outwardly of said chassis.

6. A rollover protection system as defined in claim 3, wherein said engaging members of said lower props have such a shape and dimensions that, in said free state, said engaging members are spaced from said engageable members of said upper cross bar axially of said chassis.

7. A rollover protection system as defined in claim 3, wherein said engaging members of said lower props have such a shape and dimensions that, in said free state, said engaging members am spaced from said engageable members of said upper cross bar laterally outwardly of said chassis.

8. A rollover protection system for a working vehicle comprising:

a pair of lower props fixed at lower ends thereof to a chassis;

a U-shaped upper cross bar pivotally connected to upper ends of said lower props; and connecting means disposed between said lower props and said upper cross bar for selectively permitting said upper cross bar to pivot relative to said lower props, said connecting means including:

a pair of right and left engaging members disposed at said upper ends of said lower props, respectively;

a pair of right and left engageable members disposed at lower ends of said upper cross bar, respectively; and control means for selecting between a first state to engage said engaging members and said engageable members, and a second state to disengage said engaging members and said engageable members, wherein said control means includes:

a pair of connecting bolts positioned on the pivot axis of said upper cross bar, each said connecting bolt extending through one said engaging member and one said engageable member, each said bolt having a shoulder at one end thereof;

a securing nut threadably attached to a second end of each said connecting bolt, wherein said engaging member and said engageable member are positioned between said shoulder and said securing nut; and a rotation means for causing relative rotation between each said connecting bolt and said securing nut to adjust the distance between said shoulder and said securing nut to provide for movement between said first state and said second state;

wherein said lower props and said upper cross bar have such shapes and dimensions that, when the control means is operated to provide said second state, said engaging members and said engageable members are elastically movable away from each other.

9. A rollover protection system as defined in claim 8, wherein said rotation means includes a control handle attached to each said connecting bolt for rotating said bolt relative to said securing nut.

10. A rollover protection system as defined in claim 9, wherein each said control handle is pivotally attached to said first end of said connecting bolt and pivotable between an operative position and a folded position, wherein each said lower prop includes an opening adapted for receiving a portion of one said control handle when said control handle is in said folded position.

11. The rollover protection system as defined in claim 10, wherein each said handle is spring-biased to said folded position when in said folded position.

12. The rollover protection system as defined in claim 1, wherein each said engaging member includes a plurality of column-shaped, post-like projections and each said engageable member includes a plurality of holes having a diameter and depth corresponding to said projections which are adapted to be received therein in said first state.

13. The rollover protection system as defined in claim 1, wherein each said engaging member includes a plurality of projections and each said engageable member includes a plurality of recesses adapted to receive said projections in said first state, wherein side portions of said upper cross bar are aligned with said pair of lower props when a first of said projections is received in a first of said recesses and said side portions are about 90° with respect to said pair of lower props when said first projection is received in a recess immediately adjacent said first recess.

14. A rollover protection system for a working vehicle, comprising:

a pair of lower props fixed at lower ends thereof to a chassis;

a U-shaped upper cross bar pivotally connected to upper ends of said lower props; and connecting means disposed between said lower props and said upper cross bar for selectively permitting said upper cross bar to pivot relative to said lower props, said connecting means including:

a pair of right and left engaging members disposed at said upper ends of said lower props, respectively;

a pair of right and left engageable members disposed at lower ends of said upper cross bar, respectively; and control means for selecting between a first state to engage said engaging members and said engageable members, and a second state to disengage said engaging members and said engageable members;

wherein said lower props and said upper cross bar are configured to be elastically movable between a free state corresponding to said second state of said engaging members and said engageable members and a biased state corresponding to said first state of said engaging members and said engageable members, to thereby provide an elastic force generated between said engaging members and said engageable members when in said first state to bias said engageable members and said engaging members away from each other, whereby when said control means is operated to provide said second state, said engaging members and said engageable members are elastically biased away from each other by said elastic force.

* * * * *